US006749231B2

(12) United States Patent
LeMay et al.

(10) Patent No.: US 6,749,231 B2
(45) Date of Patent: Jun. 15, 2004

(54) FLUID COUPLING PLUG

(75) Inventors: Paul Edward LeMay, Shoreview, MN (US); Blaine Glodowski, Champlin, MN (US); Troy Eugene Hackett, Minneapolis, MN (US)

(73) Assignee: Parker Hannifin Corporation, Cleveland, OH (US)

( * ) Notice: Subject to any disclaimer, the term of this patent is extended or adjusted under 35 U.S.C. 154(b) by 68 days.

(21) Appl. No.: 10/213,336

(22) Filed: Aug. 6, 2002

(65) Prior Publication Data
US 2002/0185864 A1 Dec. 12, 2002

Related U.S. Application Data

(62) Division of application No. 09/790,339, filed on Feb. 21, 2001, now Pat. No. 6,450,545.

(51) Int. Cl.$^7$ ................................................ F16L 55/00
(52) U.S. Cl. ........................ 285/93; 285/39; 285/321
(58) Field of Search ........................... 285/39, 93, 321, 285/305

(56) References Cited

U.S. PATENT DOCUMENTS

| | | | |
|---|---|---|---|
| 2,253,018 A | 8/1941 | Cowles |
| 2,805,089 A | 9/1957 | Hansen |
| 2,898,130 A | 8/1959 | Hansen |
| 3,120,968 A | 2/1964 | Calvin |
| 3,177,018 A | 4/1965 | Goodwin |
| 3,317,220 A | 5/1967 | Bruning |
| 3,398,977 A | 8/1968 | Yoneda |
| 3,447,819 A | 6/1969 | Borsum et al. |
| 3,532,101 A | 10/1970 | Snyder |
| 3,592,231 A | 7/1971 | Lamb |
| 3,637,239 A | 1/1972 | Daniel |
| 3,646,964 A | 3/1972 | Stratman |
| 3,666,300 A | 5/1972 | Russell |
| 3,758,137 A | 9/1973 | Kershaw |
| 3,773,360 A | 11/1973 | Timbers |
| 3,788,348 A | 1/1974 | Johnson |
| 3,826,523 A | 7/1974 | Eschbaugh |
| 3,831,984 A | 8/1974 | Kutina et al. |
| 3,847,421 A | 11/1974 | Eschbaugh et al. |

(List continued on next page.)

FOREIGN PATENT DOCUMENTS

| | | | |
|---|---|---|---|
| AU | 574477 | 7/1985 | |
| AU | 613190 | 5/1989 | |
| CA | 1319720 | 7/1993 | |
| EP | 90-187287/25 | 12/1988 | |
| EP | 0 509 157 A1 | 4/1991 | |
| EP | 0 397 942 B1 | 1/1993 | |
| GB | 932001 | 3/1962 | |
| GB | 2 239 503 A | 7/1991 | |
| JP | 6-185682 | * 7/1994 | .................. 285/321 |
| WO | WO 91/02919 | 3/1991 | |

Primary Examiner—Lynne H. Browne
Assistant Examiner—James M. Hewitt
(74) Attorney, Agent, or Firm—Connolly Bove Lodge & Hutz

(57) ABSTRACT

A fluid coupling includes various features. One feature is a disconnect tool that may expand a lock ring from engagement with a lock shoulder to permit the male half and female half to be separated. Another feature is to utilize geometry and structure whereby a leak would occur to indicate the condition of wear within the coupling while the coupling halves remain mechanically coupled. A further feature is to provide connection verification structure to assure that a complete connection of the male and female halves has been made. A still further feature is to provide an anti-rotational sleeve which would selectively prevent and permit relative rotation between the male half and the female half.

21 Claims, 4 Drawing Sheets

U.S. PATENT DOCUMENTS

| | | | |
|---|---|---|---|
| 3,887,222 A | | 6/1975 | Hammond |
| 3,922,011 A | * | 11/1975 | Walters ..................... 285/277 |
| 4,055,359 A | | 10/1977 | McWethy |
| 4,063,760 A | | 12/1977 | Moreiras |
| 4,077,433 A | | 3/1978 | Maldavs |
| 4,105,226 A | | 8/1978 | Frey et al. |
| 4,111,464 A | | 9/1978 | Asano et al. |
| 4,138,146 A | | 2/1979 | Rumble |
| 4,150,691 A | | 4/1979 | Maldavs |
| 4,186,946 A | | 2/1980 | Snow |
| 4,193,616 A | | 3/1980 | Sarson et al. |
| 4,198,080 A | | 4/1980 | Carpenter |
| 4,216,982 A | | 8/1980 | Chow |
| 4,222,411 A | | 9/1980 | Herzan et al. |
| 4,240,466 A | | 12/1980 | Herzan et al. |
| 4,240,654 A | | 12/1980 | Gladieux |
| 4,261,668 A | | 4/1981 | Rigal |
| 4,294,473 A | | 10/1981 | Ekman |
| 4,401,326 A | | 8/1983 | Blair |
| 4,471,978 A | | 9/1984 | Kramer |
| 4,485,845 A | | 12/1984 | Brady |
| 4,543,993 A | | 10/1985 | Calvin et al. |
| 4,543,994 A | | 10/1985 | Johnson |
| 4,564,221 A | * | 1/1986 | Ishii ........................... 285/239 |
| 4,565,392 A | | 1/1986 | Vyse |
| 4,570,980 A | | 2/1986 | Goward |
| 4,583,711 A | | 4/1986 | Johnson |
| 4,645,245 A | | 2/1987 | Cunningham |
| 4,647,082 A | | 3/1987 | Fournier et al. |
| 4,660,803 A | | 4/1987 | Johnston et al. |
| 4,662,656 A | | 5/1987 | Douglas et al. |
| 4,702,278 A | | 10/1987 | Badoureaux |
| 4,723,797 A | | 2/1988 | Veyrat |
| 4,733,890 A | | 3/1988 | Vyse |
| 4,750,765 A | | 6/1988 | Cassidy et al. |
| 4,850,622 A | | 7/1989 | Suzuki |
| 4,872,710 A | | 10/1989 | Konecny et al. |
| 4,906,031 A | | 3/1990 | Vyse |
| 4,917,525 A | | 4/1990 | Duncan |
| 5,005,877 A | | 4/1991 | Hayman |
| 5,022,687 A | | 6/1991 | Ariga |
| 5,042,848 A | | 8/1991 | Shiozaki |
| 5,074,601 A | | 12/1991 | Spors et al. |
| 5,112,089 A | | 5/1992 | Richard |
| 5,193,857 A | | 3/1993 | Kitamura |
| 5,226,682 A | | 7/1993 | Marrison et al. |
| 5,230,538 A | | 7/1993 | Kobayashi |
| 5,240,023 A | | 8/1993 | Shelef et al. |
| 5,290,009 A | | 3/1994 | Heilmann |
| 5,301,408 A | | 4/1994 | Berman et al. |
| 5,419,594 A | | 5/1995 | Nelms |
| 5,509,695 A | | 4/1996 | Hummel |
| 5,553,895 A | | 9/1996 | Karl et al. |
| 5,570,910 A | | 11/1996 | Highlen |
| 5,681,060 A | | 10/1997 | Berg et al. |
| 5,931,509 A | | 8/1999 | Bartholomew |
| 6,089,616 A | | 7/2000 | Trede et al. |
| 6,183,020 B1 | | 2/2001 | Luft |
| 6,305,721 B1 | * | 10/2001 | Heinrichs et al. .............. 285/23 |
| 6,494,494 B2 | * | 12/2002 | Vogel et al. ................... 285/39 |

* cited by examiner

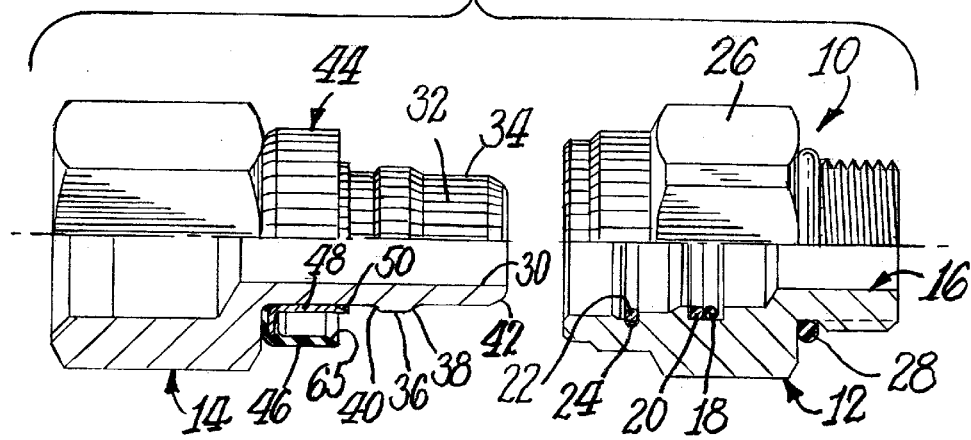
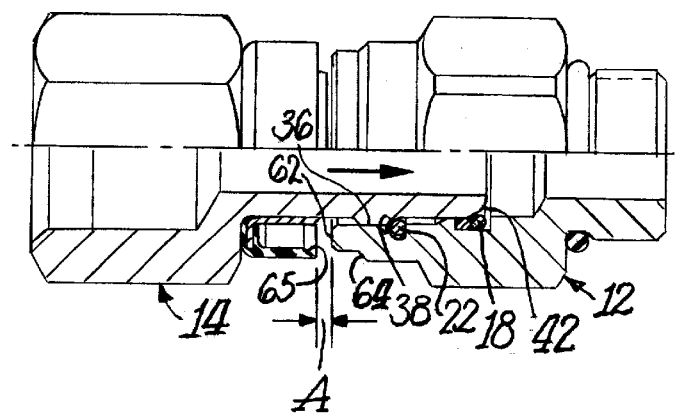
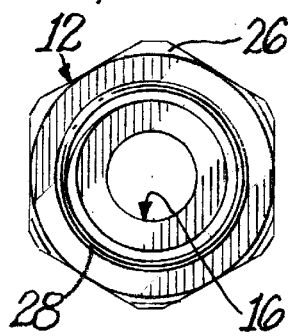
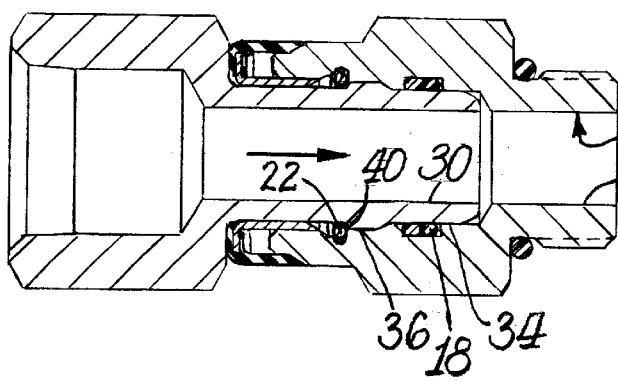

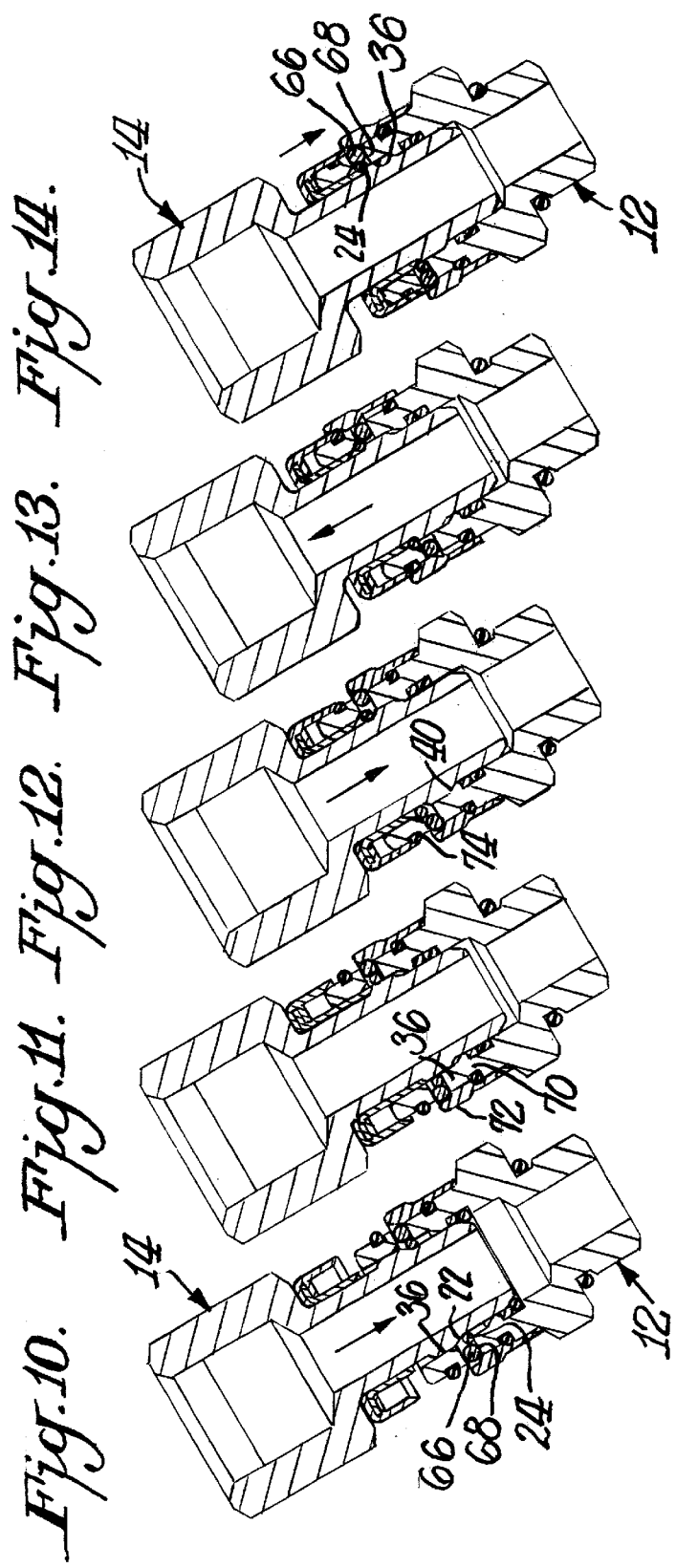

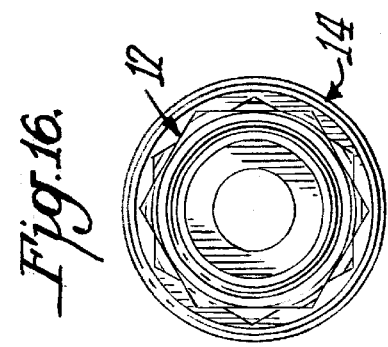
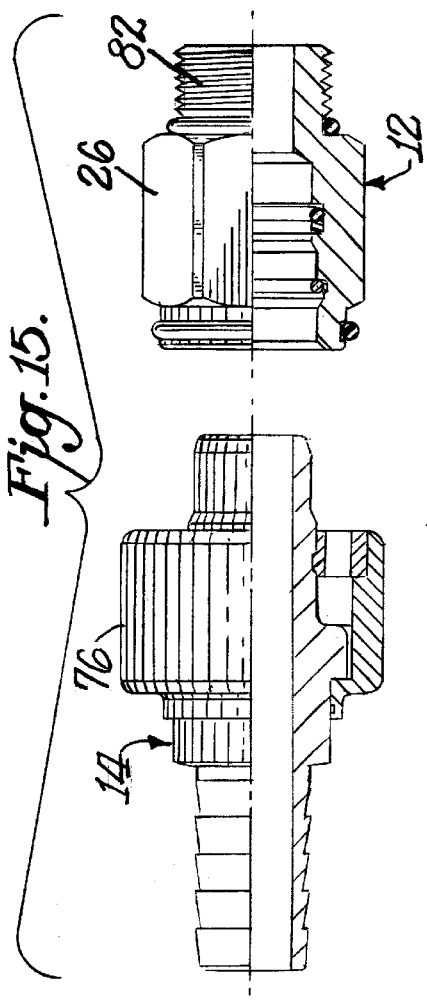
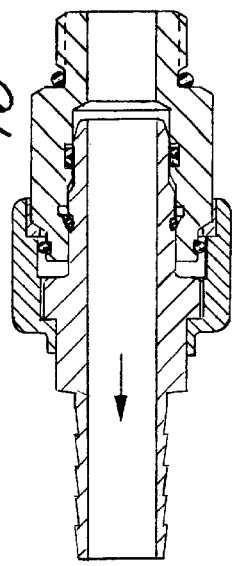
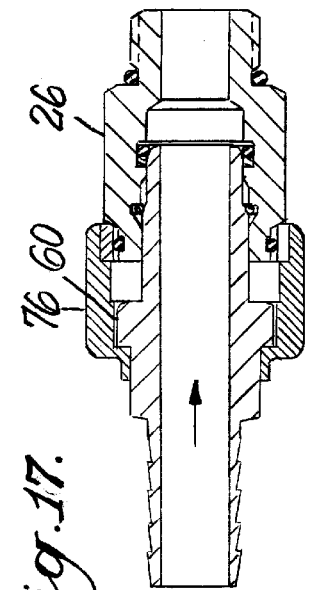
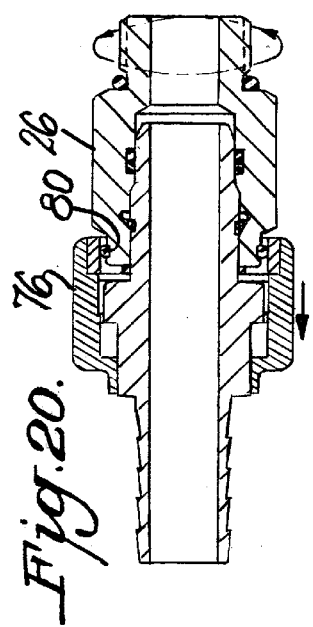
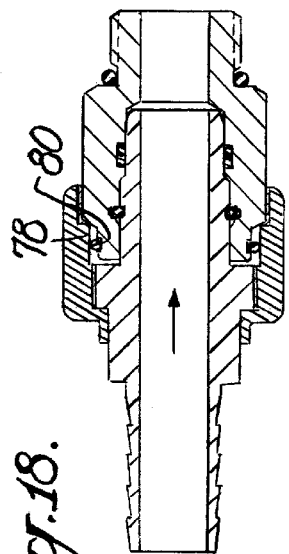

FLUID COUPLING PLUG

CROSS REFERENCE TO RELATED APPLICATION

This application is a division of application Ser. No. 09/790,339, filed Feb. 21, 2001, now U.S. Pat. No. 6,450,545.

BACKGROUND OF THE INVENTION

Various coupling assemblies or plugs are known for coupling hydraulic or pneumatic conduits. In general, one form of plug to connect fluid coupling includes a female half having a longitudinal bore with a sealing ring and a lock ring mounted in the bore. A male half includes a nipple having a sealing surface for contact with the sealing ring to create a seal between the halves. The nipple generally includes a barb extending outwardly from its outer surface to create a shoulder against which the lock ring would be disposed to mechanically lock the two halves together.

It would be desirable if such fluid couplings could be provided with some manner of readily disconnecting the two halves so that the halves can be separated from each other. It would also be desirable if some form of wear indicator device could be included in the fluid coupling to indicate that substantial wear has resulted to the barb. It would further be desirable if such fluid coupling could include some structure to verify that the two halves are mechanically locked together. It would also be desirable if some structure could be provided to prevent relative rotation of one half with respect to the other when the halves are locked together and selectively permit relative rotation when it is desired to rotate one half without having to rotate the other half.

SUMMARY OF THE INVENTION

An object of this invention is to provide various structure which accomplishes the above desires.

In accordance with one practice of this invention a disconnect sleeve is slidably mounted to the male half so that upon movement toward the split lock ring the disconnect sleeve causes the lock ring to expand and thereby permits the lock ring to move over the barb out of its locking condition.

In accordance with yet another practice of this invention the barb includes an outer surface between its locking shoulder and forward ramp so that when wear results to the barb the lock ring will remain in locking engagement with the barb until the sealing ring is no longer in sealing contact with the sealing surface of the nipple. As a result, the leakage that occurs will provide an indication of wear at a time when the halves are still coupled together.

In accordance with a further practice of this invention coupling verification structure is provided which preferably is in the form of at least one ball mounted in a hole which is in radial communication with the groove for the lock ring. As a result, when the lock ring is disposed on the outer surface of the barb the ball is displaced to such an extent that it partially extends beyond the outer surface of the female half. When, however, the lock ring passes over the barb and is disposed against the locking shoulder of the barb, the ball no longer projects from the outer surface. A verification sleeve is slidably mounted on the female half. The sliding movement of the verification sleeve is prevented by the ball when the ball extends partially beyond the outer surface of the female half thereby indicating that the halves are not yet locked together. When, however, the lock ring is disposed against the locking shoulder and the ball no longer extends beyond the outer surface of the female half, the verification sleeve can slide past the ball thereby confirming that the halves are coupled together.

In still yet another practice of this invention, anti-rotational structure is provided in the form of a sliding sleeve mounted on the male half. The sleeve has an inner surface portion which conforms to the non-circular, such as hexagonal, outer surface of the female half, as well as an inner surface portion which conforms to the non-circular outer surface on the male half. Thus, when the anti-rotational sleeve is moved over the female half the female half is prevented from rotating with respect to the male half. When it is desired to rotate the female half without rotating the male half, the anti-rotational sleeve is moved to its disengagement position.

THE DRAWINGS

FIG. 1 is an exploded side elevational view partly in section of a fluid coupling in accordance with this invention;

FIG. 2 is a side elevational view partly in section showing the fluid coupling of FIG. 1 in its initial stage of connection;

FIG. 3 is a right front elevational view showing the female half of a coupling of FIGS. 1–2;

FIG. 4 is a cross-sectional side elevational view similar to FIG. 2 showing the female and male halves fully connected;

FIG. 5 is a right rear elevational view showing the male half of the coupling of FIG. 4;

FIG. 10 is a side elevational view in section showing a fluid coupling in accordance with a further embodiment of this invention wherein the coupling includes verification structure and shows the coupling in its initial stage of connection;

FIG. 11 is a view similar to FIG. 10 showing the coupling partially connected;

FIG. 12 is a view similar to FIGS. 10–11 showing the coupling fully connected;

FIG. 13 is a view similar to FIGS. 10–12 showing the coupling in its pressurized condition with the connection verified;

FIG. 14 is a view similar to FIGS. 10–13 showing the disconnect operation;

FIG. 15 is a view similar to FIG. 1 showing yet another embodiment of this invention which incorporates an anti-rotational sleeve;

FIG. 16 is a right front elevational view showing the female half of the coupling of FIG. 15;

FIG. 17 is a cross-sectional view in elevation showing the coupling in its condition when the connection has been initiated;

FIG. 18 is a view similar to FIG. 17 showing the coupling halves fully connected;

FIG. 19 is a view similar to FIGS. 17–18 showing the coupling in its pressurized position; and FIG. 20 is a view similar to FIGS. 17–19 showing the coupling when the anti-rotational sleeve has been moved to its disengaged position.

DETAILED DESCRIPTION

Figure 6:
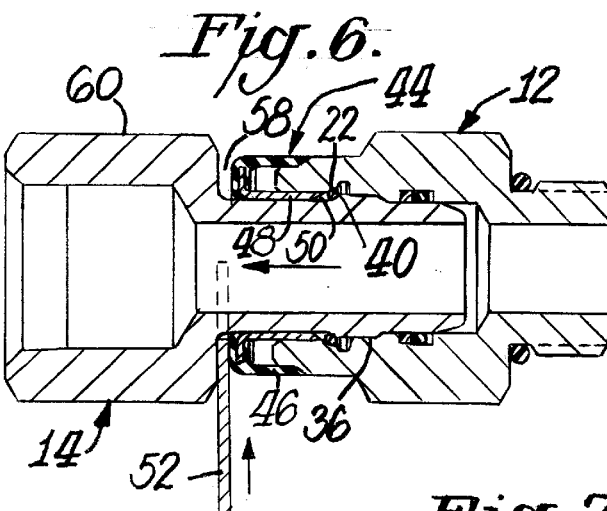
FIG. 6 is a view similar to FIG. 4 showing the halves in their connected and pressurized position and also showing the insertion of an open end fork tool to facilitate disconnection.

FIGS. 1–7 show a fluid coupling 10 in accordance with one aspect of this invention. As shown therein the coupling 10 is a plug to connect fluid coupling made up of two members generally referred to as halves, namely a female half 12 and a male half 14. Female half 12 includes a longitudinal bore 16 located axially completely through the half 12. The inner surface of bore 16 is provided with a known sealing ring 18 in a circumferential groove or recess 20 and with a lock ring 22 in a circumferential groove or recess 24. The lock ring may be of known structure in the form of a split wire ring which is biased toward its closed condition thereby spaced slightly inwardly of the base of the groove 24.

Female half 12 is otherwise of generally known construction and includes such features as a hexagonal outer surface 26 and any suitable number of gaskets 28. Coupler halves 12,14 would be made of any suitable material such as conventionally used metal material.

The male half 14 also includes a longitudinal bore 30 axially disposed for being in flow communication with bore 16 when halves 12 and 14 are coupled together. The lead end of male half 14 is in the form of a nipple 32 having a smooth cylindrical sealing surface 34 which would ultimately be in sealing contact with sealing ring 18 to create a seal between halves 12 and 14 when the coupler halves are locked together. A barb 36 extends outwardly from the periphery of nipple 32. Barb 36 includes a forward ramp 38 and a locking shoulder 40 separated by a smooth uniform diameter outer surface of barb 36.

FIG. 2 shows the coupler halves 12 and 14 when connection is initiated. As shown therein nipple 32 is inserted into longitudinal bore 16. Bore 16 which extends completely through female half 12 has four different diameters to accommodate different portions of the outer surface of nipple 32. As shown, for example, in FIG. 4 the smallest diameter portion 16A of bore 16 is of the same size as nipple bore 30 to create a fluid path through the coupling. As illustrated, the forward end 42 of nipple 40 is tapered. In the condition shown in FIG. 2 the internal O-ring or sealing ring 18 is in contact with the forward end 42. Lock ring 22 is disposed on ramp 38 which causes the split lock ring to expand and permit the lock ring to pass over the smooth outer surface of barb 36.

FIG. 4 shows the plug 10 in the condition where the coupler halves 12 and 14 are fully connected. As illustrated, sealing ring 18 is in contact with and makes sealing engagement with the forward diameter sealing surface 34 of nipple 32. Lock ring 22 has passed over barb 36 and is disposed against locking shoulder 40 to mechanically lock the coupler halves 12,14 together. This locking action thus results by the male half 14 being inserted into the bore 16 of the female half 12 until the forward ramp 38 contacts the lock ring 22. The lock ring 22 then expands up the ramp 38 and slides on the outside diameter or outer surface of barb 36 until the lock ring 22 snaps back inward to its closed condition behind the locking shoulder 40.

FIG. 6 illustrates the couplers 12,14 when the coupling or plug 10 is pressurized. As shown the male coupler 14 slides back, such as approximately 0.050 inches, until the lock ring 22 wedges against an angled surface of the internal locking groove 24.

In accordance with this invention the male coupler half 14 also includes an integral disconnect tool 44. In the preferred practice of the invention the tool 44 is made from a molded rubber outer member 46 with a metal insert 48. Thus, as illustrated the tool 44 includes an outer sleeve 46 which could be used as structure to facilitate movement of tool 44 toward the female half, as later described. Sleeve 46 also provides full connection assurance, as also later described. The metal insert 48 is also in the form of a sleeve with the base of sleeve 48 connected to the base of outer sleeve 46.

Figure 7:
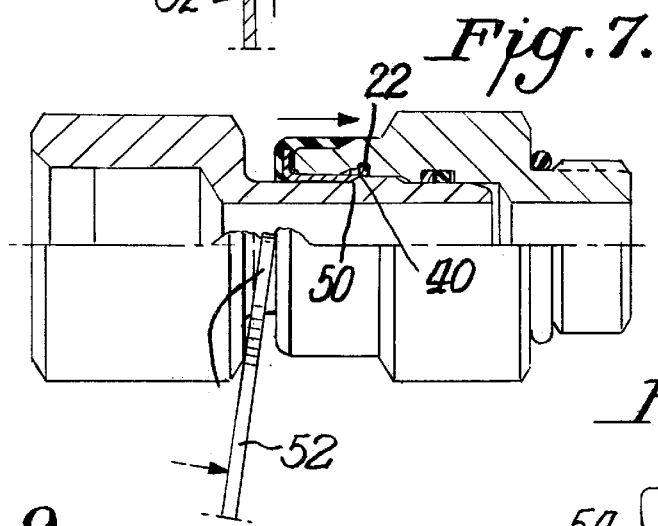
FIG. 7 is a view similar to FIG. 6 showing a phase of operation of the disconnection.

Inner sleeve 48 functions as a ring expanding member for expanding lock ring 22 from its locking condition. As shown in FIGS. 6–7 the disconnect tool 44 is moved toward female half 12. The lead end 50 of ring expanding member 46 makes contact with the lock ring 22 and the continued inward movement results in lead end 50 pushing the lock ring to an expanded or more open condition thereby forcing the lock ring 22 to expand to a size sufficient to be at least equal the outside diameter of barb 36. Advantageously, the tapered lead end 50 has the same taper and thickness as locking shoulder 40. The lead end 50 then merges into a uniform thickness portion of inner sleeve 48. Thus, when the disconnect tool is moved inwardly to its full disconnect condition (FIG. 7), the tapered lead end 50 mates with the locking shoulder 40 to create a generally continuous surface preventing the lock ring 22 from contracting to thereby maintain the lock ring 22 in its expanded condition. When in this expanded condition, lock ring 22 no longer couples male half 14 to female half 12. As a result, the coupler halves may be separated.

Figure 8:
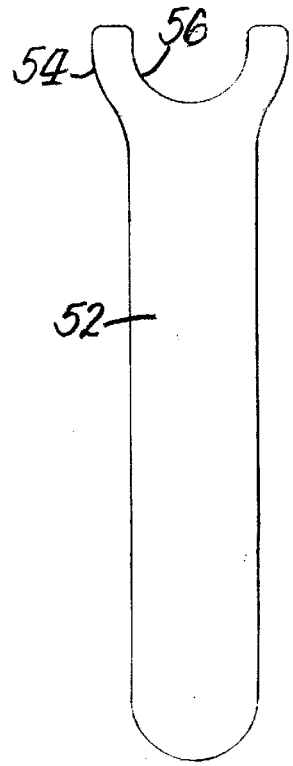
FIG. 8 is a front elevational view of the open end fork disconnect tool shown in FIGS. 6–7.

FIGS. 6–8 also illustrate the use of a tool 52 to aid in the operation of the disconnect tool 44. As shown in FIG. 8 tool 52 has a open end fork structure 54 connected to the handle end. The inner surface 56 of the open end fork is dimensioned to fit in the gap 58 disposed rearwardly of disconnect tool 44 in front of the extended hexagonal portion 60 of male half 14. By grasping handle 52 the tool 52 is disposed against the base of outer member 46 and will act as a lever to force the disconnect tool 44 axially toward female half 12. As shown in FIG. 7, with the lock ring 22 thus no longer in the locking condition, the male half 14 is released and may be removed from its connection to the female half 12.

A further feature of this invention is to provide a visual indication of a full connection of the coupler halves. When the nipple 32 is inserted and the ramp 38 first bottoms out on the lock ring 22 a visual indication is provided by a gap A which may be, for example, ⅛ inch between the face or outer end 62 of female half 12 and the lead end of disconnect outer sleeve 46. See FIG. 2. Upon full connection, as shown in FIG. 4, there is no longer a gap. Thus, the full connection is visually indicated by the outside of member 46 of disconnect tool 44 bottoming out on an external shoulder 64 of female coupler half 12. As illustrated, in the preferred practice of the invention the lead end 65 of outer member 46 has the same taper as shoulder 64 so that a smooth contact results when the couplers are in their fully connected condition illustrated in FIGS. 4 and 6–7.

A further function of the disconnect tool 44 is to protect the internal portions of the coupling from dirt/debris while connected. In addition, the disconnect tool or sleeve 44 serves as a shim/bushing to reduce side play and vibration from side loading, thus providing side load/vibration durability.

While the invention is preferably practiced by having the lead edges 50,65 of disconnect tool 44 of a complementary thickness and taper as the corresponding locking shoulder 40 and shoulder 64, the invention may be practiced without having such complementary structure.

Another aspect of this invention is the provision of structure or geometry which accurately indicates that wear has resulted in the coupler. A concern of the design of the prior art couplings is the failure mode. Because the prior art couplings can be easily forced to rotate under pressure conditions, certain applications can cause the joint to wear from rotation. Such wear can eventually result in an uncontrolled separation of the joint. This invention takes into account the possibility that the joint may wear from forced rotation/vibration. Such wear will be realized by the gradual axial separation of the two halves of the coupling. As the wear progresses, eventually the male half will lose contact with the coupler seals, and thus pressure will be relieved in a controlled manner. This differs from the prior art couplings which maintain seal engagement throughout such progressive wear. The resultant failure mode of the prior art couplings is joint separation in an uncontrolled manner.

Figure 9:
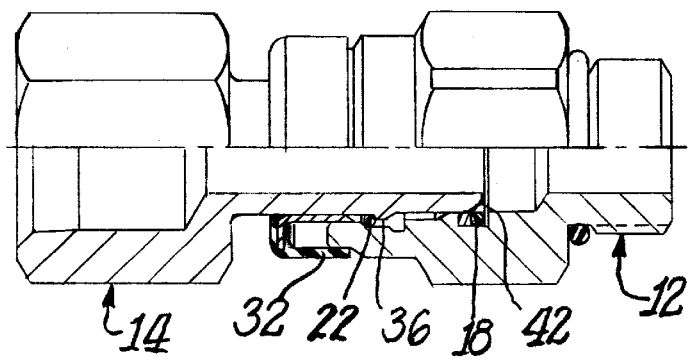
FIG. 9 is a side elevational view partly in section showing a fluid coupling under conditions of wear.

In accordance with this invention the outer surface of barb 36 is made of sufficient length so that some form of shoulder still remains to be in contact with the lock ring 22 as the barb 36 reduces, in size. As barb 36 wears, the relative position of sealing ring 18 against the sealing surface 34 changes. FIG. 9 illustrates a condition where barb 36 is almost completely worn, but still remains with a shoulder disposed against lock ring 22. Sealing ring 18, however, has reached a location, such as at the tapered lead end 42 of nipple 22, so that it is no longer in sealing contact. The result is a breaking of the seal which causes the coupling to leak. Significantly, however, the leak occurs while the coupler halves are still mechanically locked together by lock ring 32 still being in contact with what remains of barb 36. The physical result of a leak thus provides an indicator that there has been significant wear of the barb. The provision of this wear indication would alert the user to make the necessary repair or replacement.

FIGS. 10–14 illustrate a further aspect of this invention which provides connection verification so that the user will be assured that the lock ring 22 is in its locking condition. This aspect of the invention meets the challenge presented with a plug to connect fittings wherein the assembler should be able to determine that there has been full connection. If, for example, a threaded fitting is only partially connected or tightened it fails in a controlled manner (leakage). If a plug to connect fitting is partially connected, the two halves separate in an uncontrolled manner. It can be difficult for an assembler to determine the connection state of a plug to connect fitting. The determination is particularly prone to human error in high volume assembly.

With the present invention, the embodiment illustrated in FIGS. 10–14 provides an assurance to the assembler that the connection is complete. In general, this aspect of the invention provides an indicator member, preferably a ball, selectively disposed in the path of sliding movement of a connection verification sleeve. When the lock ring is located at the outer surface of the barb not yet in its locking condition, the indicator member or ball acts as a stop which prevents further sliding movement of the connection verification sleeve. When, however, the lock ring is in its locking condition against the locking shoulder of the barb, the indicator member no longer acts as a stop and the operator can slide the verification sleeve to a forward detent position thereby verifying that a full connection has been made.

As shown in FIGS. 10–14 the indicator member is in the form of at least one and preferably a plurality of spherical members such as steel balls 66 each of which is located in a tapered cross hole 68 drilled into the female body aligned with the internal lock ring recess or groove 24 in which the lock ring 22 is located. By locating each ball 66 in its respective hole 68, the ball 66 is disposed against the lock ring 22. When the lock ring 22 is in the expanded condition during the connection process, the lock ring 22 presses or lifts the balls 66 radially outward to a position above being flush with the outside diameter of the front end 70 of the female half. As also shown in FIGS. 10–14 a verification sleeve 72 is slidably mounted on the front end 70 of the female half. Verification sleeve 72 has a path of sliding motion which would extend past the location of the balls 66. When the coupling is only partially connected, as in FIG. 11, the balls 66 extend partially outwardly beyond the outer surface of front end 70 and the verification sleeve 72 can not slide forward because of interference with the balls. When the connection of the halves 12, 14 is complete, however, the lock ring 22 drops in behind the locking shoulder 40 of the male half 14. The balls 66 then drop radially inward and no longer project beyond the outer surface of front end 70. Thus, the verification sleeve 72 can slide to its forward detent position shown in FIG. 13. In this position the sleeve extends to and around the end of the disconnect tool outer member 46 and is located and held in place by gasket 74.

As described for the embodiment illustrated in FIGS. 10–14, the operator becomes fully aware of the condition of the coupling. When the coupling is only in its partially connecting state the operator can not slide the verification sleeve 72. An active inspection of the joint can easily be part of the assembler's connection sequence.

The invention is preferably practiced where verification sleeve is a complete sleeve completely surrounding the lead end 70 of the female half 12. In addition, a plurality of balls 66, such as steel balls are located in cross holes drilled around the periphery of the female half lead end 72. In its broadest aspect, however, the invention may be practiced with only a single ball as the indicator member or with the indicator members having shapes other than being completely spherical or being of any other suitable shape. In addition, the verification sleeve could be in the form of a cage or of a base member having outward spokes positioned so that the path of motion will pass over or against the indicator members. The use of a closed sleeve and spherical indicator members or balls, particularly a plurality of balls, provides the simplest and most effective connection verification arrangement.

Although FIGS. 10–14 illustrate the connection verification arrangement to be used with a coupling having a disconnect tool, it is to be understood that either feature may be used independently of the other.

FIGS. 15–20 show yet another embodiment of this invention which may be used alone or in combination with any of the other previously described embodiments. FIGS. 15–20 relate to the provision of anti-rotational structure to selectively prevent or permit relative rotation of the female half and the male half with respect to each other. As illustrated, the female half and male half may include the same locking and sealing features previously described. In the embodiment of FIGS. 15–20, however, the male half 14 is also provided with an anti-rotational sleeve 76 which is slidably mounted for movement in a longitudinal direction. The sleeve 76 may be made of any suitable material and preferably is manufactured of plastic which is press fit on the male half 14. The sleeve 76 interlocks with the hex outer surface 60 of the male half and, when the halves are connected together, the sleeve 76 also interlocks with the hex outer surface 26 thus effectively acting as an anti-rotational mechanism. Additionally, the sleeve 76 has an inner diameter 78 that seals with an external O-ring 80 on the female half 12 to protect the internal portions of the coupling from dirt and debris while connected.

In the connection sequence the male half would be inserted into the coupler bore until the forward ramp of the barb contacts the lock ring 22, as previously described. As also previously described, the lock ring then expands up the ramp and slides up the barb until the lock ring 22 snaps back inward behind the locking shoulder 40 of the male half 14. When the coupling is pressurized the male half slides back until the lock ring 22 wedges against an angled surface of the internal locking groove 24 in the female coupler body or half 12.

FIG. 15 illustrates the female half 12 and the male half 14 before any connection is made. FIG. 17 shows the connection initiated. FIG. 18 shows the female half 12 and the male half 14 fully connected. FIG. 19 shows the coupling in its pressurized condition.

FIG. 20 illustrates the coupler components in the process of disengagement. While the coupling halves are permanently connected, the female half 12 may have its threaded end 82 unthreaded from its port connection without rotating the male half of the coupling. To permit such relative rotation, the anti-rotational sleeve 76 is moved axially to disable the anti-rotational hex interlock which had occurred when the inner surface of sleeve 76 was disposed around the hex outer surface 26 of female half 12. A wrench may then be used to unthread the female half of the coupling from its port connection. The male half is not forced to rotate with the female half during this unthreading.

In the preferred practice of the invention both the female half 12 and the male half 14 include a hexagonal outer surface. The inner surface of the anti-rotational sleeve 76 has complementary shaped portions for fitting against the corresponding hex surfaces 26,60. As illustrated the inner surface of sleeve 76 is of a step formation in that the smallest diameter inner surface portion is disposed against hex portion 60 of male half 14. The intermediate size diameter inner surface portion 78 is disposed for contacting O-ring 80. The largest diameter inner surface portion is disposed for fitting over hex portion 26 of female half 12.

It is to be understood that this aspect of the invention shown in FIGS. 15–20 may be practiced with other variations. Thus, for example, the anti-rotational sleeve could be permanently mounted to the female half and moved toward the male half. Additionally, although it is preferred to provide the anti-rotational sleeve with an inner surface which directly complements the outer surface of both the female half and the male half, the sleeve could be permanently mounted to one of the halves in any suitable manner and be of any suitable shape as long as the sleeve is capable of sliding movement to be disposed over the other half. In its broadest aspect the other half which is selectively disposed under the sleeve has a non-circular outer surface, which need not be hexagonally shaped. A hex shape is preferred, however, since that is the conventional shape. Even where the half such as the female half has a hex outer shape, the inner surface of the sleeve need not fully complement that shape so long as it has some type of projection to act as a stop which would prevent rotation of the female half with respect to the male half where the sleeve is fixed to the male half. Additionally, while the invention is preferably practiced where the anti-rotational sleeve 76 is of closed structure, the sleeve could be slotted or in the form of a base member having spokes or some other stop structure which would prevent rotation of the female half.

It is to be understood that while this invention has been described with respect to various individual aspects or features, such features may be used either alone or in combination with each other without departing from the spirit of this invention.

What is claimed is:

1. A fluid coupling comprising a female half and a male half, said female half having a longitudinal bore extending completely therethrough for the passage of fluid through said female half, a sealing ring peripherally mounted at the inner surface of said bore of said female half, an expandable annular locking member biased to a contracted condition mounted in a peripheral groove in said inner surface of said bore of said female half, the groove longitudinally displaced from said sealing ring, said male half including a longitudinal bore extending completely therethrough in flow communication with said female half bore when said female half and said male half are coupled together, said male half having a nipple at its forward end for insertion into said bore of said female half, said nipple having an outer surface, a peripheral portion of said outer surface being a sealing surface for being peripherally contacted by said sealing ring when said female half and said male half are coupled together, an outwardly extending barb on said outer surface of said nipple, a tapered forward ramp at one end of said barb for expanding said locking member when said nipple is inserted into said bore of said female half to permit said locking member to ride up said forward ramp and over said barb during insertion movement of said nipple into said female half, said barb having a locking shoulder remote from said forward ramp for engagement by said locking member when said locking member has passed over said barb to lock said male half to said female half, said barb having an outer surface between said ramp and said locking shoulder, said outer surface having an initial longitudinal length sufficiently long to maintain locking engagement of said barb with said locking member during conditions of wear which reduces the length of said outer surface of said barb until the seal between said sealing ring and said sealing surface is broken thus permitting leakage of the fluid to provide an indicator of wear while said female half and said male half remain coupled together with said locking member still engaged with said barb.

2. The coupling of claim 1 including a disconnect tool slidably mounted on said male half, said disconnect tool comprising an inner member and a radially spaced outer member connected to said inner member for joint sliding motion, and said inner member having a lead end disposed for contacting said locking member to expand said locking member to a sufficient size to permit said locking member to move back over said barb and thereby disconnect said female half and said male half from each other.

3. The coupling of claim 2 wherein said locking shoulder is tapered, and said lead end of said inner member being of a complementary taper.

4. The coupling of claim 3 said lead end of said inner sleeve merges into a uniform thickness portion of said inner sleeve, and said uniform thickness portion being flush with the outer surface of said barb to create a continuous surface.

5. The coupling of claim 4 wherein said outer member is in the form of an outer sleeve spaced from a forward edge of said female half before said female half and said male half are coupled together to create a gap which provides a visual indication of partial connection.

6. The coupling of claim 5 wherein the forward edge of said female half has a peripheral recess, said outer sleeve being seated in said recess when said female half and said male half are fully connected, said inner sleeve being made of a metal material, and said outer sleeve being made of a resilient material.

7. The coupling of claim 6 wherein said locking member is a split ring.

8. The coupling of claim 2 wherein said outer member is in the form of an outer sleeve spaced from a forward edge of said female half before said female half and said male half are coupled together to create a gap which provides a visual indication of partial connection.

9. The coupling of claim 1 wherein said locking member is a split ring.

10. The coupling of claim 1 wherein at least one hole is in said female half in radial communication with said groove for said locking member, an indicator member mounted in said hole, said indicator member being in contact with said locking member, said indicator member being urged by said locking member to extend partially beyond an outer surface portion of said female half when said locking member is located at the outer surface of said barb, said indicator member extending no further than said outer surface portion of said female half when said locking member is against said locking shoulder in a locking condition, a verification sleeve slidably mounted on said female half, said indicator member being selectively in the path of motion of said verification sleeve whereby said indicator member acts as a stop for said verification sleeve when said indicator member partially extends beyond said outer surface portion of said female half to indicate that said female half and said male half are not coupled together, and said indicator member permitting said verification sleeve to pass over said indicator member when said locking member is in its locking condition with said indicator member not extending beyond said outer surface portion of said female half to indicate that said female half and said male half are coupled together.

11. The coupling of claim 10 wherein a plurality of said holes are in said female half, a said indicator member being in each of said holes, and said indicator members being in the form of spherical balls.

12. The coupling of claim 1 wherein one of said female half and said male half has a non-circular outer surface, an anti-rotational sleeve being mounted to the other of said female half and said male half, said anti-rotational sleeve having an inner surface portion which acts as stop structure when said anti-rotational sleeve is moved to a position where said inner surface portion is disposed around said non-circular outer surface to prevent relative rotation of said female half and said male half with respect to each other, and said anti-rotational sleeve being slidable to a disengagement position which permits relative rotation between said female half and said male half.

13. The coupling of claim 12 wherein said anti-rotational sleeve is mounted on said male half, said anti-rotational sleeve being of closed form, and said inner surface portion having a complementary shape to said non-circular outer surface of said female half.

14. The coupling of claim 13 wherein said male half having a non-circular outer surface, said anti-rotational sleeve having a further inner surface portion disposed around and having a complementary shape to said non-circular outer surface of said male half, an O-ring mounted in a reduced diameter portion of the lead end of said female half, said anti-rotational sleeve having an intermediate inner surface portion in sealing contact with said O-ring, and said inner surface portions of said anti-rotational sleeve being of stepped configuration to accommodate the different sizes of said non-circular outer surface of said female half and said reduced diameter portion of said female half and said non-circular portion of said male half.

15. A method of detecting a wear condition in a fluid coupling including inserting a male half into a female half, coupling the male half to the female half by an expandable annular locking member disposed in a peripheral groove on an inner surface of the female half and disposed against a shoulder of a barb on the outer surface of the male half, creating a fluid tight seal between the male half and the female half by a sealing ring disposed against the inner surface of the female half and the outer surface of the male half, the longitudinal length of the barb decreasing during use of the coupling, longitudinally shifting the position of the male half and female half with respect to each other at the location of the fluid tight seal as the barb wears, providing as the barb a barb of sufficient initial longitudinal length so that the annular locking member remains disposed against the shoulder of the barb at least until the fluid tight seal begins to break to cause the coupling to leak while the male half and female half remain coupled together, and utilizing the existence of the leak as a physical indication that there has been significant wear of the barb before there has been an actual failure of the coupling condition of the male half and female half to each other.

16. A fluid coupling comprising a female half and a male half, said female half having a longitudinal bore extending completely therethrough for the passage of fluid through said female half, a sealing ring peripherally mounted at the inner surface of said bore of said female half, an expandable annular locking member biased toward a contracted condition mounted in a peripheral groove in said inner surface of said bore of said female half, the groove longitudinally displaced from said sealing ring, said male half including a longitudinal bore extending completely therethrough in flow communication with said female half bore when said female half and said male half are coupled together, said male half having a nipple at its forward end for insertion into said bore of said female half, said nipple having an outer surface, a peripheral portion of said outer surface being a sealing surface for being peripherally contacted by said sealing ring when said female half and said male half are coupled together, an outwardly extending barb on said outer surface of said nipple, a tapered forward ramp at one end of said barb for expanding said locking member when said nipple is inserted into said bore of said female half to permit said locking member to ride up said forward ramp and over said barb during insertion movement of said nipple into said female half, said barb having a locking shoulder remote from said forward ramp for engagement by said locking member when said locking member has passed over said barb to lock said male half to said female half, a disconnect tool slidably mounted on said male half, said disconnect tool including an inner member slidably mounted on said male half, said inner member of sleeve having a lead end disposed for contacting said locking member to expand said locking member to a sufficient size to permit said locking member to move back over said barb and thereby disconnect said female half and said male half from each other, said locking shoulder being tapered, and said lead end of said inner sleeve being of a complementary taper.

17. The coupling of claim 16 wherein said lead end of said inner sleeve merges into a uniform thickness portion of said inner sleeve, and said uniform thickness portion being flush with the outer surface of said barb to create a continuous surface.

18. The coupling of claim 17 wherein a radially spaced outer member is connected to said inner member for joint sliding motion, and said outer member being in the form of an outer sleeve spaced from a forward edge of said female half before said female half and said male half are coupled together to create a gap which provides a visual indication of partial connection.

19. The coupling of claim 18 wherein the forward edge of said female half has a peripheral recess, said outer sleeve being seated in said recess when said female half and said male half are fully connected, said inner sleeve being made of a metal material, and said outer sleeve being made of a resilient material.

20. The coupling of claim 16 wherein a radially spaced outer member is connected to said inner member for joint sliding motion, and said outer member being in the form of an outer sleeve spaced from a forward edge of said female half before said female half and said male half are coupled together to create a gap which provides a visual indication of partial connection.

21. The coupling of claim 16 wherein said locking member is a split ring.

* * * * *